United States Patent [19]
Keesee

[11] Patent Number: 5,769,449
[45] Date of Patent: Jun. 23, 1998

[54] TRUNK TRUCK TRAILER

[76] Inventor: Oliver F. Keesee, 605 Dean Rd., Clarksville, Tenn. 37040

[21] Appl. No.: 561,066

[22] Filed: Nov. 22, 1995

[51] Int. Cl.$^6$ ..................................................... B62D 63/08
[52] U.S. Cl. ........................... 280/656; 224/511; 280/78; 280/704
[58] Field of Search ........................ 108/44, 49; 224/511, 224/512, 518, 496, 497, 498; 280/704, 711, 78, 495, 500, 656, 204

[56] References Cited

U.S. PATENT DOCUMENTS

| | | | |
|---|---|---|---|
| 1,992,808 | 2/1935 | Bishoff | 280/78 X |
| 2,564,996 | 8/1951 | Rasbach | 280/78 X |
| 3,575,439 | 4/1971 | Lusk | 280/78 X |
| 4,055,354 | 10/1977 | Sharpe | 280/78 X |
| 4,786,073 | 11/1988 | Harper | 280/656 |
| 5,397,148 | 3/1995 | Nelson | 280/656 X |

Primary Examiner—Brian L. Johnson
Assistant Examiner—Michael Mar
Attorney, Agent, or Firm—William F. Hamrock

[57] ABSTRACT

A trailer having a main body which includes a flat bed assembly with front, sides, and tailgate flat panels which are hingedly and releasably connected to a central flat floor panel. The main body is releasably connected to an upper portion of an attachment mechanism. The attachment mechanism has a lower portion adapted to be received within a rear portion of a vehicle and releasably secured thereto. The main body is supported by an air shock wheel assembly which includes a cylindrical casing having an upper housing affixed to a flat plate and depending downwardly therefrom and a lower housing slidably received within the upper housing. An air shock piston is mounted within the cylindrical casing and connected to the upper and lower housings for telescoping movement therewith. A swivel mechanism is formed at a lower end of the lower housing. A wheel supporting frame is pivotally attached to the swivel mechanism. A plurality of telescoping support arms have upper ends pivotally connected to brackets secured to the underside of the central flat floor panel and lower ends pivotally connected to brackets secured to the swivel mechanism.

16 Claims, 6 Drawing Sheets

TRUNK TRUCK TRAILER

FIELD OF INVENTION

The present invention relates generally to vehicle trailers and more particularly to a quickly assembled and releasable flat bed trailer that extends into an open trunk of a vehicle and can be folded into a box end trailer.

DESCRIPTION OF THE PRIOR ART

Vehicle mounted trailers, adapted for transporting a variety of loads are known in the art:

U.S. Pat. No. 3,144,183 to Lamberti discloses a baggage carrier adapted to be supported above the trunk and hooked to the window frame of an automobile. The carrier has a platform extending behind the automobile and supported by a single vertically adjustable wheel. The platform is composed of hinged panel sections. This carrier has several drawbacks, including it being attached to the window frame which may obstruct or block the rear view of the automobile driver. Further, to reduce or eliminate the blind spots newer vehicle are designed with little or no window frames in the rear. In newer vehicles if the carrier is attached to the rear window frame the support so provided may not be strong enough to bear heavier loads thus making the carrier inoperable for heavier loads. Patentee's platform does not have side extensions, therefore the loads thereon may fall during lateral shifts caused by the moving automobile. Also, it appears that sections from the platform are unable to pivot at or near a point of their attachment. Thus, it appears that there is almost no leeway for the platform to flex by pivoting under heavier loads, sudden weight shifts or uneven surfaces.

U.S. Pat. No. 4,029,245 to Berlin describes a frame for carrying lumber that provides an extension of an automobile trunk area. The frame is supported by brackets and an intermediate support that are secured to the floor of an automobile trunk. The frame height can be adjusted and may be supported at a level with the upper portion of the rear wall of the trunk. A major drawback is that the frame is not suitable for carrying different types of loads.

U.S. Pat. Nos. 2,777,625 to Kronhaus et al. and 5,033,662 to Godin disclose carriers supported by brackets which extend under the rear end of the automobile.

U.S. Pat. Nos. 2,254,437 to Marney and 3,917,316 to Furnish describe single wheel supported trailers that are adapted to be stored, when not in use, in the trunk of an automobile.

The above patents describe trailers that have a one piece floor or bed. The trailers do not have any margin for flexing when traveling over uneven surfaces or bumps in the roads. Thus, any bumps or uneven surfaces will cause a great deal of weight shifts and produce uneven forces on the trailer and the vehicle. As stated above these trailers are therefore less stable.

KD The following U.S. Pat. Nos. also describe trailers.
1,629,403
2,169,076
2,490,014
2,509,794
2,549,018
2,558,153
2,576,385
2,691,546
2,795,363
2,879,072
3,144,183
3,612,600
4,645,230
5,033,662

SUMMARY OF THE INVENTION

The novel trunk truck trailer of the invention solves many of the problems and shortcomings of the prior art trailers for vehicles. The present invention provides an attractive, durable and large trailer apparatus which can be quickly assembled as needed and easily dismantled to be compactly stored when not in use.

In the preferred embodiment, the invention involves three units which join together to form the trunk truck trailer hereinafter referred to as the trailer. The units include an A-Frame support assembly, an elongated horizontal flat bed assembly and an air shock wheel assembly. The A-frame support assembly, hereinafter referred to as the A-frame support, is secured within the trunk of the vehicle or to the rear floor of a truck vehicle. Hereinafter, all references to the trunk are also applicable to the rear floor of the truck. A front panel of the flat bed assembly is secured within the front and rear of the trunk which secures the trailer to the vehicle by a double anchored locked position. The flat bed assembly, hereinafter referred to as the flat bed, is composed of a number of hingedly attached flat panels extending from the trunk forming an elongate flat bed as well as being capable of forming side and tailgate panels about a floor panel to form a box like structured trailer. The air shock wheel assembly includes a wheel assembly and a shock absorber assembly which support the flat bed or boxed trailer and allow customizing the shock resistance to different weights of the load exerted on the trailer.

There are many advantages exhibited by the present trailer over similar prior art trailers. Most importantly, it is the superiority of the combined functioning of the A-frame support, the flat bed and the air shock wheel assembly which produce a superior operating trailer apparatus.

One important advantage of the flat bed boxed trailer being formed of hingedly attached panels as disclosed is that the panels pivot around an axis that is substantially parallel to the connection of each panel to the floor panel which tends to stabilize the trailer connection to the vehicle. For example, the front panel which is attached to the A-frame in the trunk is pivotally attached at its rear to the floor panel so that when subjected to vehicle turns, or sudden road shifts, or heavy loads, either the front panel will flex with respect to the rest of the trailer about an axis that is substantially parallel to the connection between the front panel and the floor panel, or the floor panel will flex with respect to the front panel about a similar axis, depending upon which part of the trailer is heavier. This will stabilize the vehicle and the trailer and will help to reduce and eliminate unequal weight distribution therein.

A further advantage is that the air shock assembly in combination with the A-frame support insures that the level of the trailer flat bed is at least as high as the rear wall of the vehicle trunk. The front panel of the flat bed is secured to the A-frame within the trunk above the trunk back wall. The air shock assembly supports the floor panel by increasing or decreasing the amount of air in the air shock piston to keep the level of the flat bed at the desired height either above or resting on the trunk rear wall. This allows even weight distribution which increases the vehicle safety, efficiency and fuel economy.

BRIEF DESCRIPTION OF THE DRAWINGS

The structure and manner of operation of the invention, together with the further objects and advantages thereof, may best be understood by reference to the following description taken in conjunction with the accompanying drawings, in which identical reference numerals identify similar elements, and in which.

DETAILED DESCRIPTION OF THE DRAWINGS

Figure 1:
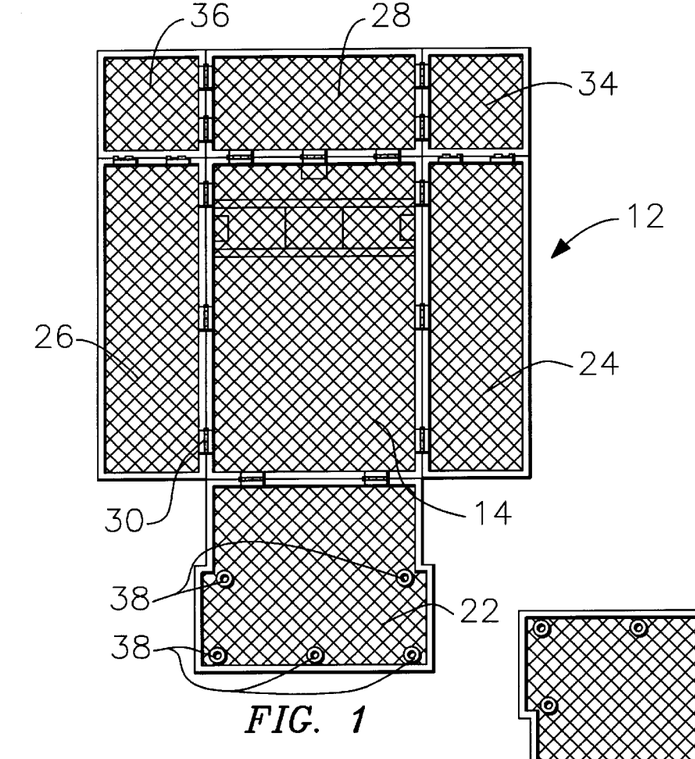
FIG. 1 is a top view of the assembled trailer bed.
Figure 2:
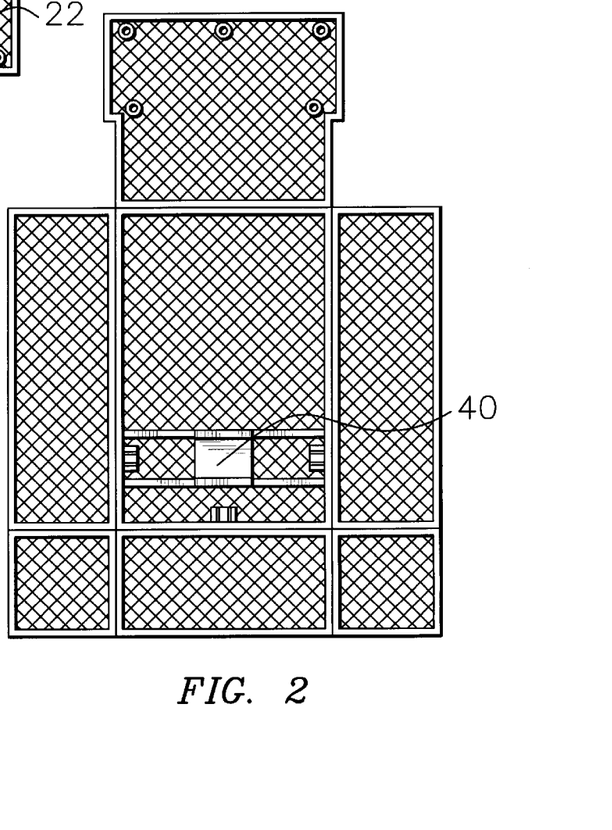
FIG. 2 is a bottom view of the assembled trailer bed.
Figure 8:
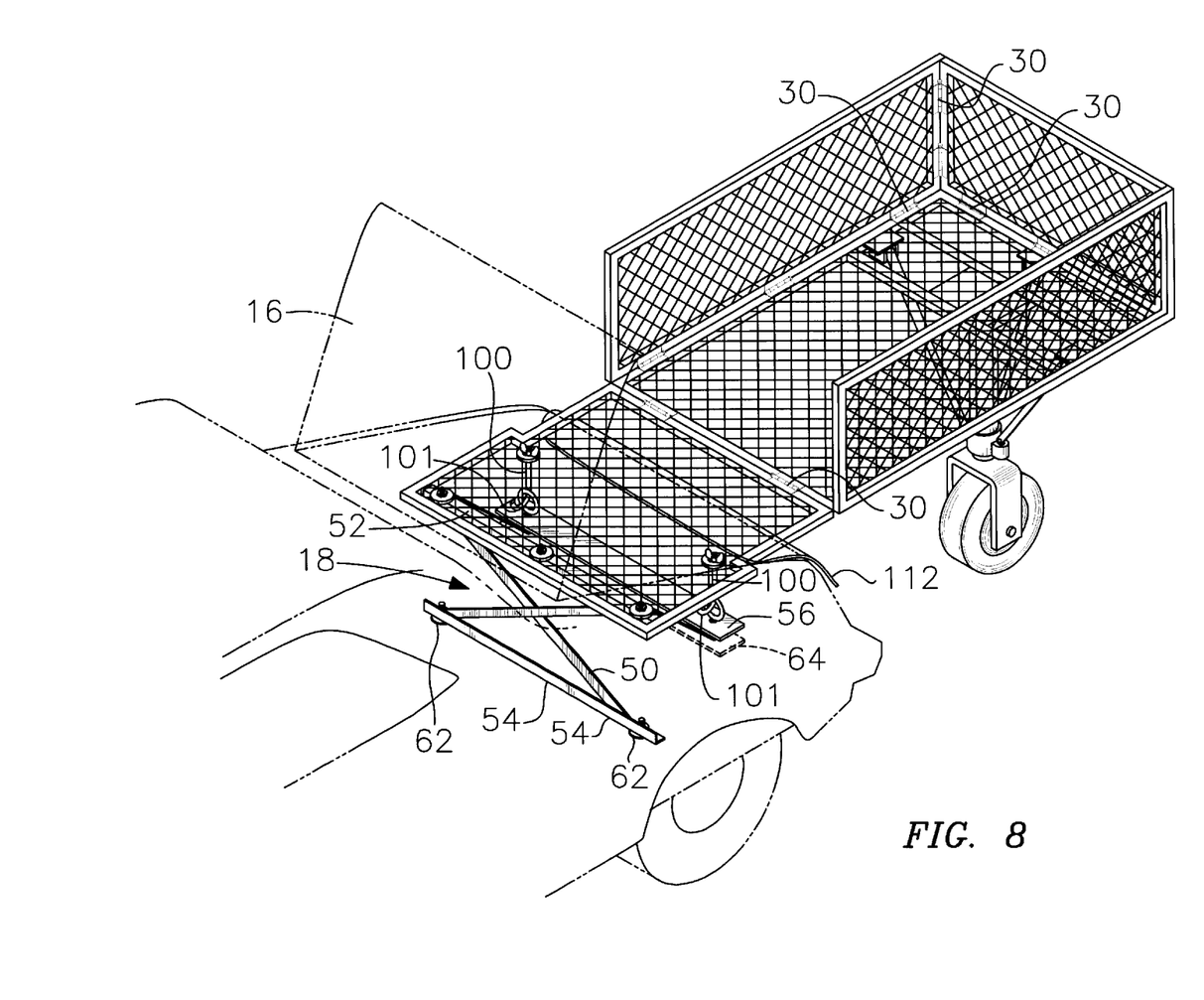
FIG. 8 is a perspective view of the trailer mounted within the vehicle trunk.

Referring to the drawings, and as generally shown in FIGS. 1, 2 and 8, it is seen that trailer 10 embodies an elongated flat bed 12 composed of horizontal floor panel 14 having a number of panels hingedly attached either to it or to other panels. In a preferred embodiment of the invention, the front end of flat bed 12 extends into trunk 16 of the vehicle. The front of the flat bed is secured to a built up A-frame support 18 mounted within the trunk. Secured to the underside of floor panel 14 is air shock wheel assembly 20 which supports the trailer when in use.

Figures 5, 5A:
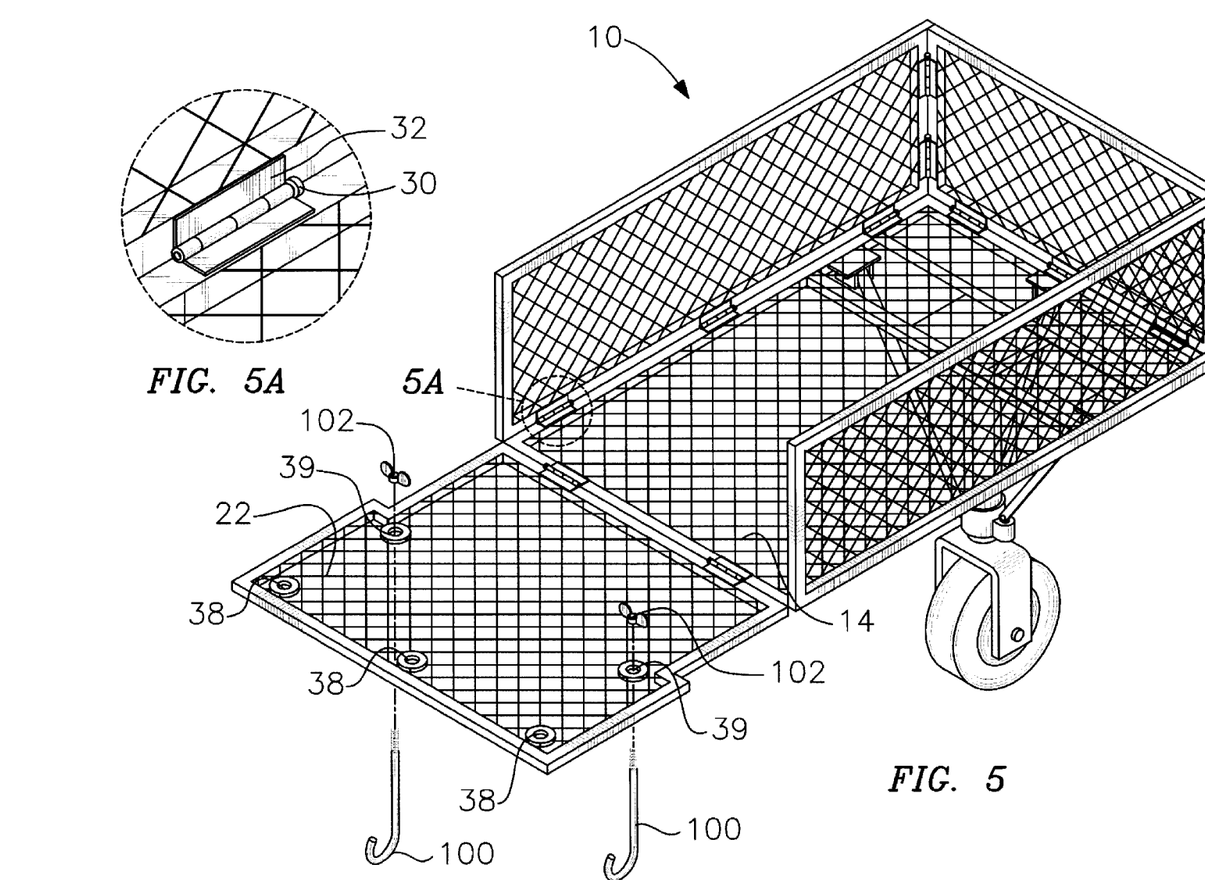
FIG. 5 is a perspective view of the trailer with side and tailgate panels folded into a box end trailer.
FIG. 5A is a view of a panel hinge attachment.

FIGS. 1 and 2 are top and bottom views respectively of the assembled elongated flat bed 12. Floor panel 14 is shown hingedly attached within front panel 22, side panels 24 and 26 and tailgate panel 28 by a plurality of hinges 30 and removable bolts 32. FIG. 5A is a view of hinges 30 and removable bolt 32 which serves either to selectively disengage the panel members or to lock them in position. Rear right and left side panels 34 and 36 respectively are hingedly attached to the side panels 24 and 26 and tailgate panel 28 to complete the assembled elongated flat bed.

When all the panels are laid flat in the elongated flat bed as shown in FIGS. 1 and 2, the adjoining edges of the panels are longitudinally hinged by the adjacent hinges 30 and are secured by means of removable bolts 32. The front, two sides and tailgate panels are adapted to fold inwardly onto the upper surface of floor panel 14. When the trailer is set-up in the box like structure as seen in FIGS. 5 and 8, rear right and left side panels 34 and 36 are first removed from the elongated flat bed and the two side panels 24 and 26 and tailgate panel 28 are set-up and hinged vertically by the adjacent hinges and secured by removable bolts 32. Thus, the trailer is capable of being used either with the elongated flat bed supporting the load or with the box like structure supporting the load.

Figures 3, 3A, 4, 4A:
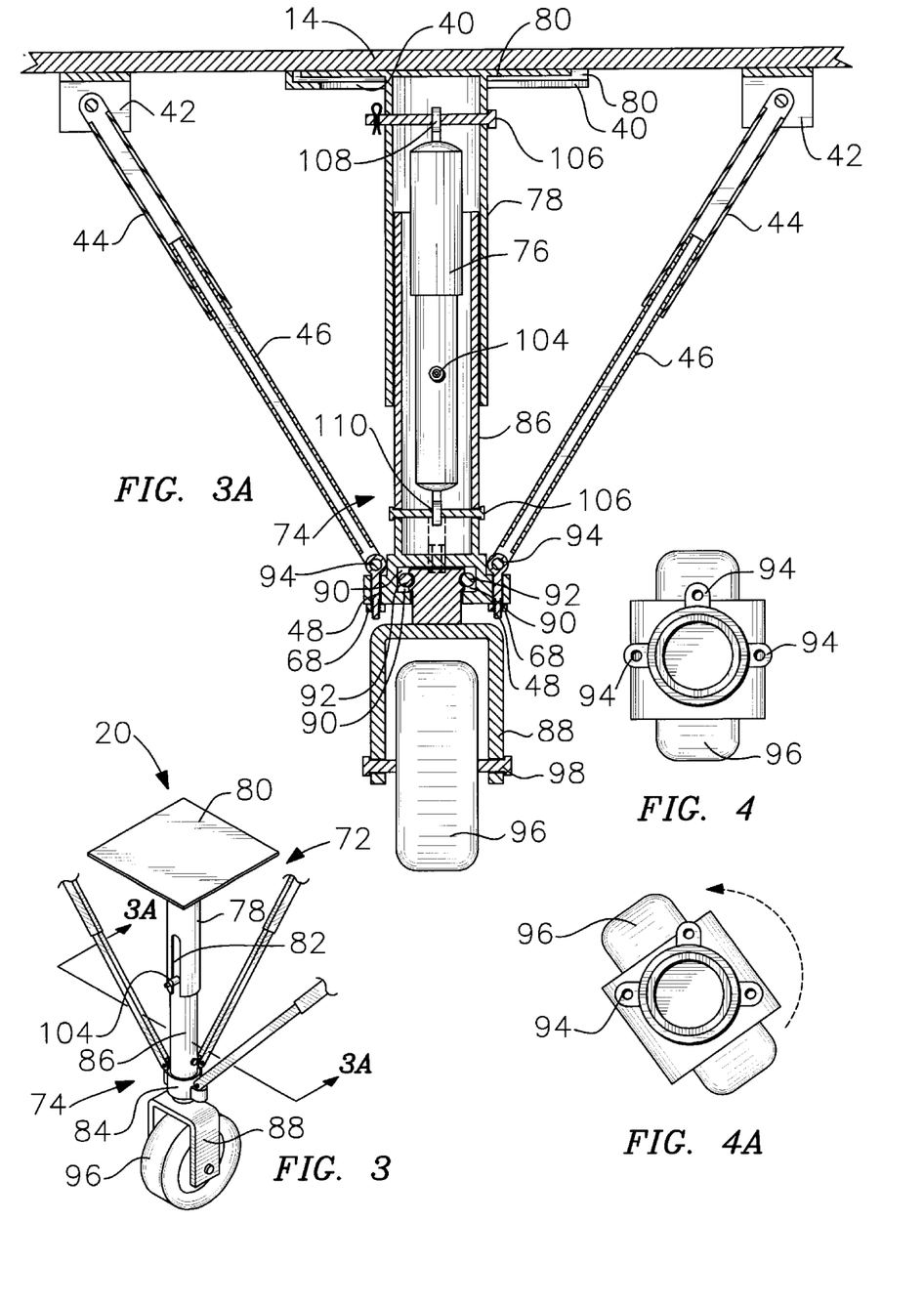
FIG. 3 is a perspective view of the air shock wheel assembly.
FIG. 3A is a sectional view of the wheel assembly attached to the trailer bed.
FIG. 4 is a top view of the swivel wheel assembly.
FIG. 4A is a top view of the swivel wheel assembly showing the wheel turning.

Further as shown in FIGS. 1 and 2, front panel 22 includes apertures 38 which receive mounting attachments from the A-frame support 18 to secure the flat bed within the trunk of the vehicle. Rectangular channel support 40 is shown welded or otherwise secured to the underside of floor panel 14 to slidably receive rectangular flat plate 80 of air shock wheel assembly 20 as seen in FIG. 3A and in conjunction with other mounting attachments thereby securing the wheel assembly to the structure. The mounting attachments include three equally spaced hollow legs 44 pivotally attached to brackets 42 for coaxial telescopic sliding attachment of the upper ends of support arms 46 thereto. Threaded pins 48 are provided at the lower ends of support arms 46 to pivotally attach to air shock wheel assembly 20 to complete the attachment of the air shock wheel assembly to the underside of floor panel 14.

Figures 6, 6A, 7:
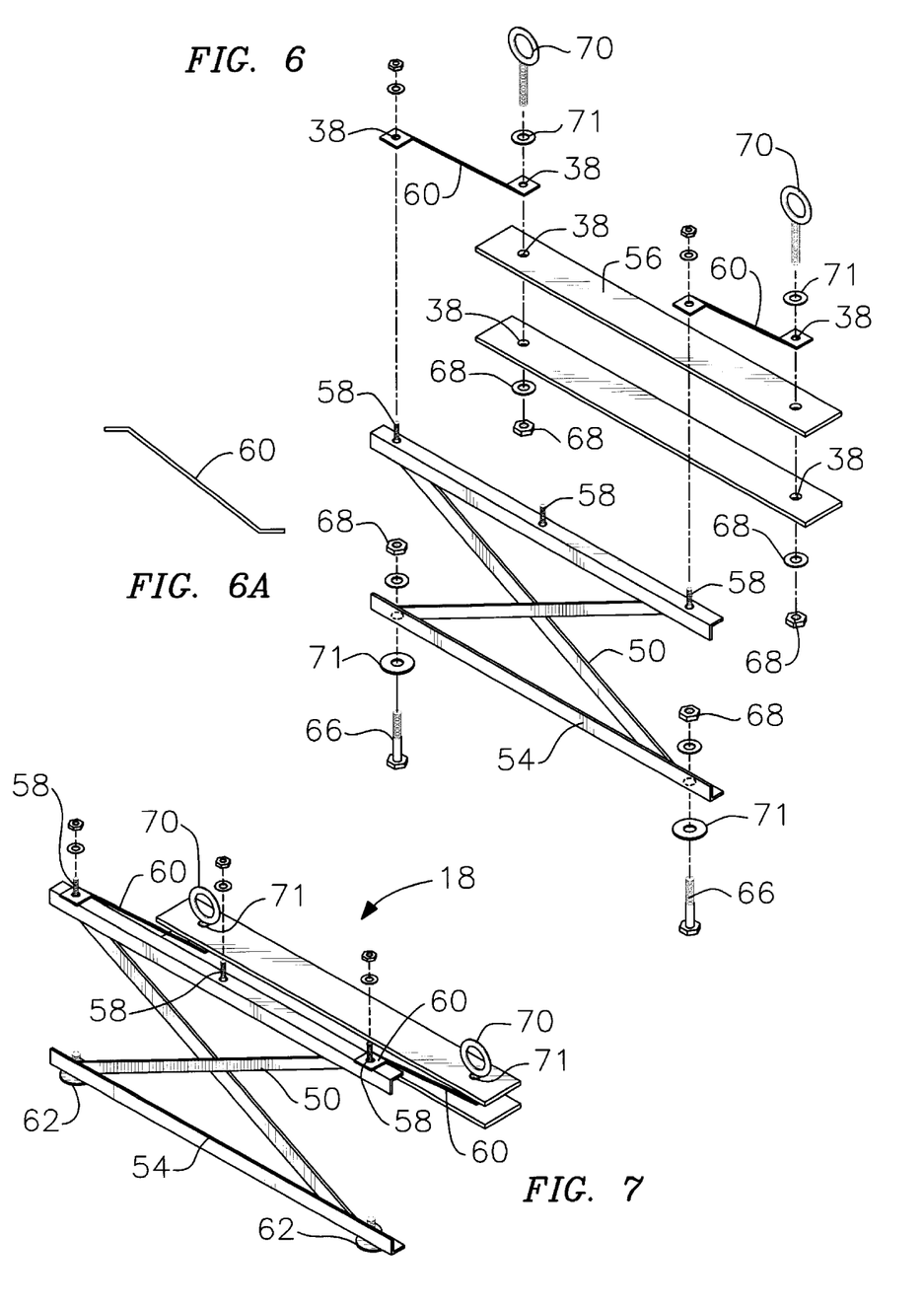
FIG. 6 is a partly exploded view of the support frame.
FIG. 6A is a view of an angle brace.
FIG. 7 is a view of the assembled support frame.

Shown in FIG. 8 is the trailer attached to A-frame support 18 made of durable heavy metal which is securely seated within trunk 16 of the vehicle. A-frame 18 as seen in FIGS. 6, 7 and 8 has a front and a back portion. The front portion is formed by securing a pair of vertical criss-crossing support bars 50 at their top and bottom ends to a pair of horizontal parallel spaced apart top angle iron 52 and bottom angle iron 54. The back portion is formed by flat angle iron 56 secured to the floor of the vehicle. The back end portion is connected to the front portion by a pair of angle braces 60 which are secured at one end to flat angle iron 56 and loosely affixed at its opposite end to threaded studs 58 on top angle iron 52.

There may be two supports secured to the vehicle to help secure the A-frame within the trunk. They may involve two laterally spaced flat iron supports which are welded or otherwise secured to the rear underbody of the vehicle beneath the width of the trunk. The two flat iron supports are designated as front flat iron support not shown which may extend under the front end of the trunk and rear flat iron support 64 which extends under the rear end of the trunk and have apertures formed at opposite ends of the flat iron supports for receiving threaded bolts securing the A-frame within the trunk. Instead of the front flat iron support a front flat support washer 62 is used. Two threaded frame bolts 66 secure the A-frame from underneath the vehicle by passing up through the apertures in front flat support washer 62, through the floor of the trunk and through apertures 38 formed at opposite ends of bottom angle iron 54 to secure the front portion of the A-frame in the trunk with nuts 68. The back portion of A-frame is secured in the trunk to the rear flat iron support 64 by two threaded eye bolts 70 which operate to secure the back end of A-frame by passing from inside to the outside underside of the trunk. Eye bolts 70 pass down through a washer 71 which may be attached thereto, through the apertures 38 on the connecting ends of braces 60, down through flat angle iron 56 through the floor of the trunk and through rear flat iron 64 where it is releasably threadedly secured through nut 66 and washer 71 or other means of attachment. The unattached opposite ends of angle braces 60 are then loosely affixed onto the two threaded studs 58 located at each end of angle iron 52 accommodating apertures 38 on the attaching ends of the angle braces. At this point, the A-frame is then securely attached within the trunk floor of the vehicle.

Shown in FIG. 3 is air shock wheel assembly 20 which includes upper housing 72 mounted on wheel assembly 74 both of which securely enclose and flexibly support therein air shock piston 76 as illustrated in the sectional view in FIG. 3A. Upper housing 72 is constructed of perpendicular cylindrical casing 78 welded or otherwise secured, extending down from, and to rectangular flat plate 80 exhibiting slot opening 82 extending partway up the wall of the casing. The construction of lower wheel assembly 74 comprises suspension swivel mechanism 84 intermittently aligned between upper wheel cylindrical casing 86 which fits within cylindrical casing 78 and wheel frame 88 at the lower end. As seen in FIG. 3A, swivel mechanism 84 includes internal channel 90 providing a plurality of ball bearings 92 permitting frictionless turning of the wheel assembly as depicted in FIGS. 4 and 4A and easy maneuverability of the entire trailer 10. On the periphery of the swivel mechanism are three equally spaced brackets 94 which cooperate with flexibly securing elements of floor panel 14 to the wheel assembly which will be discussed below. Wheel 96 is shown attached within wheel frame 88 by means of axle 98.

Turning now to FIGS. 5 and 8, it is seen how front panel 22 is mounted on A-frame support 18. As discussed previously, with respect to FIGS. 6, 7 and 8, the A-frame support is secured within trunk 16 by frame bolts 66 at the front of the trunk and by eye bolts 70 at the rear of the trunk, as well as angle braces 60 which are loosely mounted onto threaded studs 58 at each end of top angle iron 52 as depicted in FIGS. 6, 6A and 7. When attaching the flat bed to the A-frame support, front panel 22 is mounted initially on the three aligned threaded studs 58 which are fixed in spaced apart relation on top angle iron 52 by cooperating with the three aligned apertures 38 at the forward end of the front panel 22. Next, each hook 101 of the two threaded J-bolts 100 is then hooked within the eye of an eye bolt 70 secured through flat angle iron 58 and the threaded end passed upwards through the corresponding rear aperture 39 in front panel 22 over the rear end of the trunk. The front panel 22 is then securely anchored to the A-frame support by five wing nuts 102 threaded onto the three threaded studs 58, which also securely anchor the angle braces 60 on the outer studs, and the two threaded ends of the J-bolts. It is this locking mechanism of the invention whereby the front panel 22 is attached to the front and back of the A-frame support which in turn is attached to the front and rear flat iron supports 62 and 64 on the underbody of the vehicle that forms a solid attachment which holds the trailer firm, level and substantially steady. As the front panel 22 is held substantially steady, the only point about which the trailer will pivot is at the hinges 30 between front panel 22 and floor panel 14. This one point pivot allows the load on the boxed trailer with its sides and tailgate hingedly attach upright as shown in FIG. 8 to remain steady even if the easily maneuverable wheel 96 goes over bumps, ditches or other situations wherein the load or vehicle may become unsteady.

Next, floor panel 14 is hingedly attached to the back end of front panel 22 by removable bolts 32 passing through the two hinges 30 as depicted in FIG. 5A which then allows the floor panel 14 to be swung upwardly at about 90 exposing its underside. It is at this point in the assembly of the trailer that the air shock wheel assembly 20 is attached to the underside of floor panel 14. A preferred procedure to do so is for the upper housing 72 of the air shock wheel assembly 20 to be placed upside down with its flat plate 80 on the ground and its open end of cylindrical casing 78 facing upwardly wherein air shock piston 76 top side down is slid within cylindrical casing 78 and having release valve 104 fitted within slot opening 82. In order to secure the shock piston therein, the cylindrical casing 78 is diametrically apertured near its top end to receive locking pin 106 which passes through the cylindrical casing and top loop 108 of the air shock piston to slidably secure the shock piston in the casing. In the next step, wheel assembly 74 is attached to the upper housing 72 by sliding the wheel cylindrical casing 86 top side down into cylindrical casing 78 and inserting another locking pin 106 through the diametrically apertured wheel cylindrical casing at its lower end and bottom loop 110 of the air shock piston to slidably secure the shock piston 76 within the air shock wheel assembly 20.

The air shock wheel assembly is then secured to the channel support 40 located in about the center and near the rear on the underside of floor panel 14. Pivotally attached to the three brackets 42, equally spaced one on each side of and one to the rear of channel support 40, are three rigid hollow rectangular legs 44 dangling therefrom to which support arms 46 are to be inserted. The three rigid rectangular support arms 46 having threaded pivoting pins 48 at their lower ends are then coaxially telescopically slidably enclosed at their upper ends within rectangular legs 44 and are pivotally attached at their lower ends by inserting threaded pins 48 within swivel brackets 94 and securing them therein by means of nuts 68. At this point the shock wheel assembly is now secured to the underside of floor panel 14 which has been secured to front panel 23 which has been secured to A-frame support 20 which has been secured within the trunk 16 of the vehicle.

The next step is to add pressurized air to the air shock piston 76 through air valve 104. Preferably, it is done when the floor panel 14 is swung upright about 90 degrees because of the reduced resistance to receiving the air pressure in this position as opposed to the wheel being on the ground. However, the air can be added after the floor panel has been dropped down supported by the wheel assembly on the ground. When the floor panel 14 is positioned as seen in FIG. 3A and the pressurized air is added through air valve 104, the lower end of air shock piston 76 slidably expands downwardly causing the entire wheel assembly 74 to be forced downwardly which in turn pulls the telescopically slidably enclosed support arms 46 downwardly. This forced downward movement exerts an upward pressure on floor panel 14 which equalized any load that is placed thereon. Thus, when the trailer is under a heavy load and/or in motion, the continuous extension and contracting of the air shock wheel assembly 20 and support arms 46 in conjunction with the swivel mechanism 84 providing effective turning and smoother riding of wheel 96 result in a more efficient, more reliable, safer and more economical trailer than of the prior art similar type trailers.

The preferred trailer as shown in the drawings comprises the panels made of sturdy metal frame members having parallel and connecting rectangular support members for supporting heavy metal wire linkages forming open structured panel sections. However, it is within the contemplation of the invention to form the panels of various type materials such as heavy or light metal, plastic or wood whichever is suitable for the operation of the trailer. Likewise, with respect to the A-frame and air shock wheel assembly as shown in the drawings made of sturdy metal construction, any materials that satisfy the operation of the trailer for its intended purpose are acceptable.

The trailer can be easily dismantled by removing the bolts 32 from the hinges 30 and placing the panels inside the trunk or stored elsewhere. The A-frame support can be quickly dismantled by removing the nuts 68 and eyebolts 70 for easy storage. Likewise, the air shock assembly can be separated into the upper wheel housing 72 and wheel assembly 74 by removing locking pins 106 from the shock piston top and bottom loops 108 and 110 and removing the nuts 68 to free support arm the pins 48 from swivel brackets 94.

A further improvement to mounting the trailer within the trunk of the vehicle is shown in FIG. 8. A protective pad 112 made of rubber, plastic or similar protective material is placed between the trailer and the vehicle trunk. The protective pad 112 protects the rubber seal around the perphery of the vehicle trunk from any forces exerted thereon.

Figure 9:
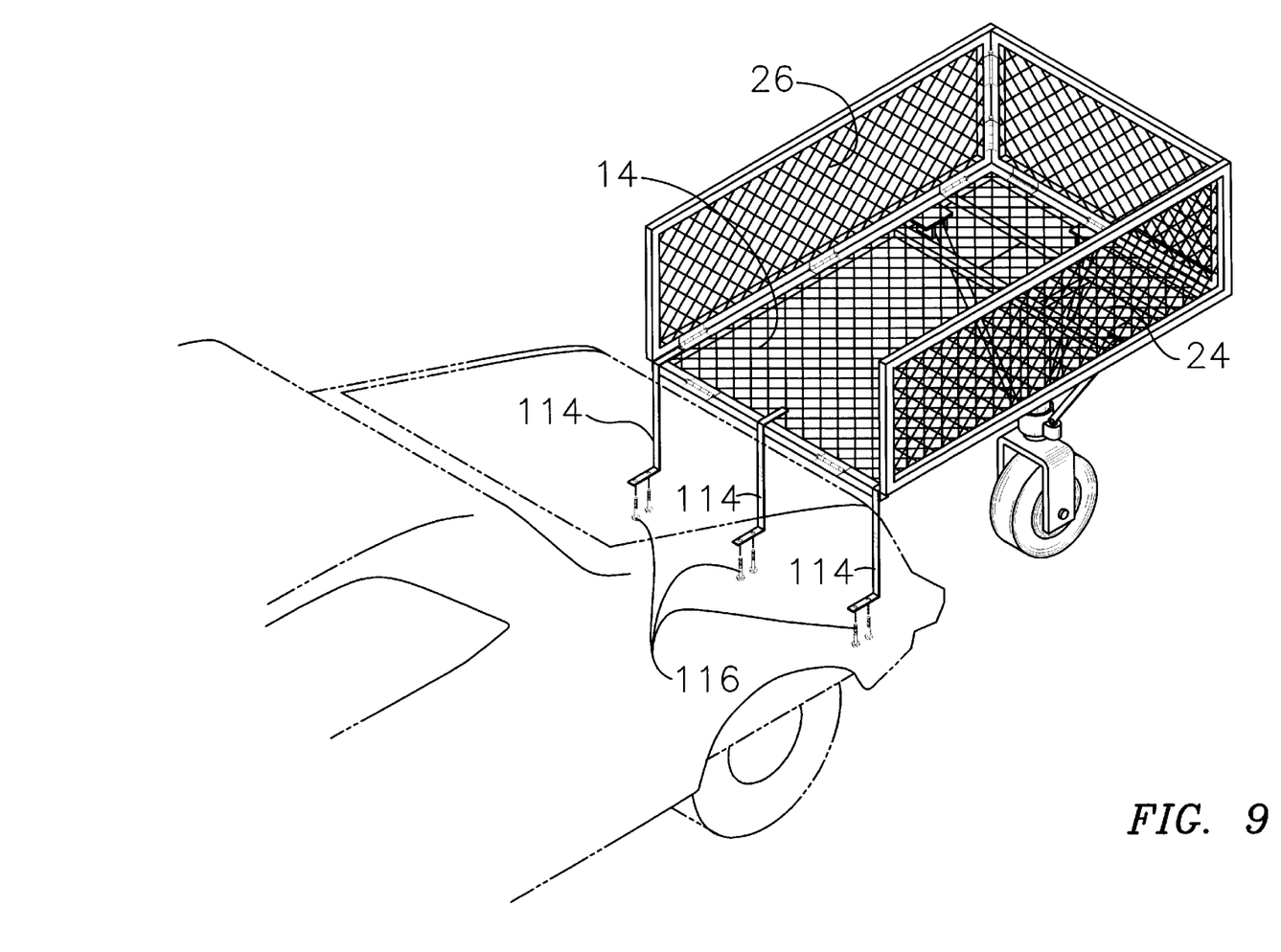
FIG. 9 is a perspective view of the trailer mounted under the rear of the vehicle.

In another embodiment of the invention, FIG. 9 shows how the box like structure without the front panel being present can be attached to the vehicle. As seen, Z shaped support arms 114 are secured to floor panel 14 and then secured within the trunk, or A-frame or on the bumper or any other part of the vehicle by bolts 116 or other securing means. Any means of attaching the box like structure to the vehicle is permissible. Also, the front panel may be present and set up in the box like structure secured to the vehicle by any securing means.

Thus, it is apparent that there has been provided, in accordance with the broad teachings of the present invention, a trailer that fully satisfies the objects, aims and advantages set forth above. While the invention has been described in conjunction with specific embodiments thereof the true scope of the invention should not be so limited, it is evident that many alternatives, modifications, and variations, will be apparent to those skilled in the art in light of the foregoing description without departing from the scope of the invention. Accordingly, it is intended to embrace all such alternatives, modifications and variations as fall within the spirit and broad scope of the invention, including the appended claims.

What is claimed is:

1. A trailer attachable to a rear portion of a vehicle comprising:
    a main body including a flat bed assembly having front, sides, and tailgate flat panels which are hingedly and releasably connected to a central flat floor panel,
    an attachment mechanism having an upper portion adapted to be releasably connected to said main body and a lower portion adapted to be received within a rear portion of the vehicle and releasably secured thereto,
    an air shock wheel assembly including a flat plate, a cylindrical casing having an upper housing affixed to said flat plate and depending downwardly therefrom and a lower housing slidably received within said upper housing, an air shock piston mounted within said cylindrical casing and connected to said upper and lower housings for telescoping movement therewith, a swivel mechanism formed at a lower end of said lower housing, a wheel supporting frame pivotally attached to said swivel mechanism, and a plurality of telescoping support arms having upper ends pivotally connected to brackets secured to the underside of said central flat floor panel and lower ends pivotally connected to brackets secured to said swivel mechanism, and
    coupling means for releasably mounting said flat plate of said air shock wheel assembly to an underside of said central flat floor panel.

2. A trailer according to claim 1 wherein said front flat panel is releasably mounted within the rear trunk of the vehicle.

3. A trailer according to claim 2 wherein said front flat panel is releasably mounted on said attachment mechanism which is formed by an open structured frame support releasably mounted in the trunk.

4. A trailer according to claim 3 wherein said front flat panel is releasably mounted to a front and a rear portion of the open structured frame support.

5. A trailer according to claim 4 wherein said front portion of the open structure frame support includes a bottom support releasably mounted to the trunk and an upright support wherein said front flat panel is releasably mounted to said upright support.

6. A trailer according to claim 5 wherein said rear portion of the open structured frame support includes a bottom support releasably mounted to the trunk and an eyebolt releasably mounted thereto.

7. A trailer according to claim 6 wherein said rear portion of the open structured frame support is releasably mounted to said front portion of the open structured frame support.

8. A trailer according to claim 7 wherein said front flat panel has apertures releasably mounted on projecting engagement means on the upright support and has J-bolts releasably mounted on the eye bolts.

9. A trailer according to claim 1 wherein said sides and tailgate flat panels from the flat bed assembly are releasably connected together in an upright configuration for enclosing said central flat floor panel in a box-like structure.

10. A trailer according to claim 8 wherein two additional flat side panels are releasably mounted to said flat sides and tailgate panels in the flat bed assembly.

11. A trailer according to claim 2 wherein said coupling means comprise a central flat channel support mounted on the underside of said central flat floor panel for slidably receiving said flat plate.

12. A trailer according to claim 1 wherein said support arms are pivotally mounted to three equally spaced brackets on said swivel mechanism.

13. A trailer according to claim 1 wherein said swivel mechanism comprises an internal channel providing a plurality of ball bearings.

14. A trailer according to claim 1 wherein said flat panels are made of heavy metal wire linkages with sturdy metal frame members having parallel and connecting support members.

15. A trailer according to claim 1 wherein said central flat floor panel is releasably mounted to the rear portion of the vehicle when the tailgate flat panel has been disconnected from the central flat floor panel.

16. A trailer according to claim 15 wherein said sides and tailgate panels are adapted to be releasably connected together to form a box like structure.

\* \* \* \* \*